Sept. 2, 1952  A. F. GOLDSBY ET AL  2,609,123
SEED PLANTER WITH ELECTRICALLY VIBRATED FEED TROUGH
Filed Sept. 6, 1946
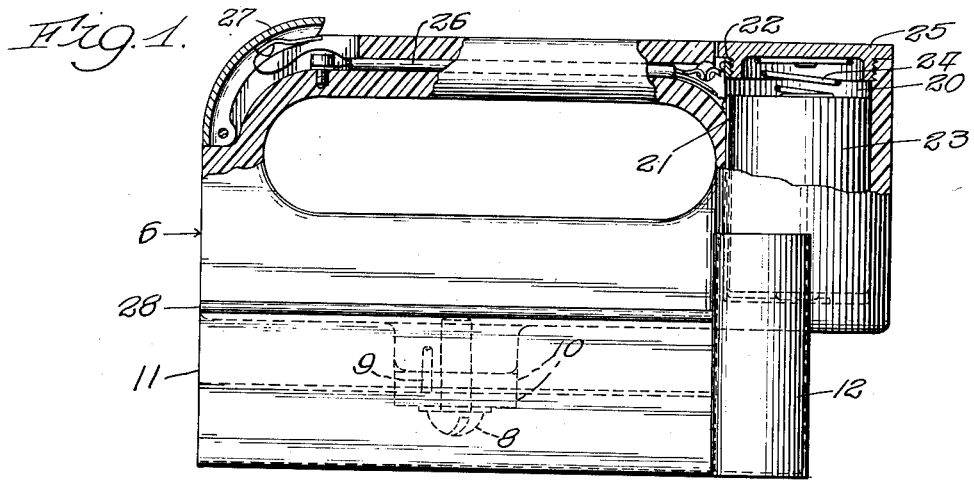
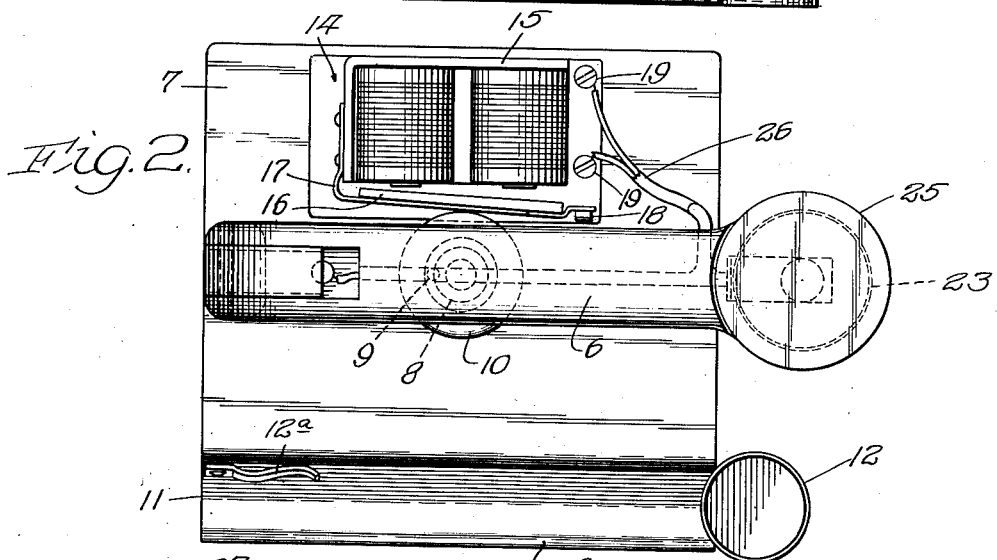
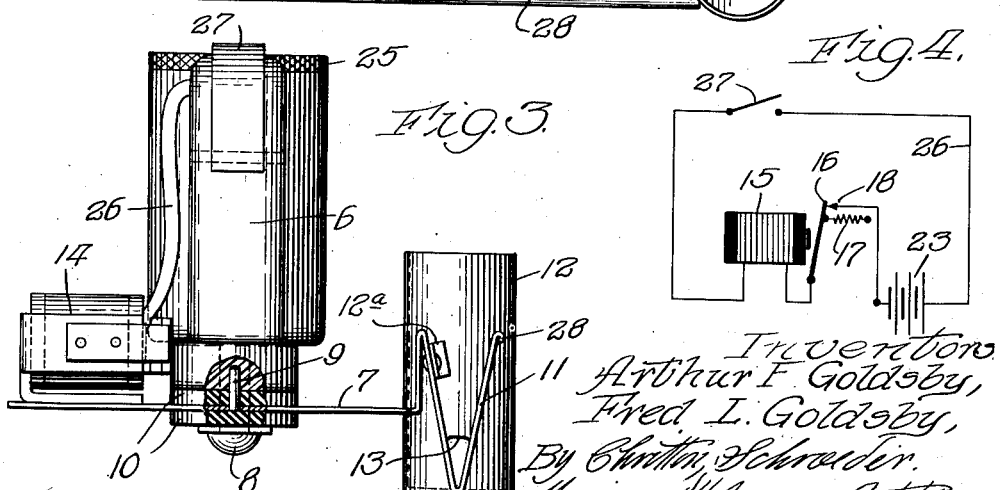

Patented Sept. 2, 1952

2,609,123

UNITED STATES PATENT OFFICE 2,609,123

SEED PLANTER WITH ELECTRICALLY VIBRATED FEED TROUGH

Arthur F. Goldsby and Fred L. Goldsby, Chicago, Ill.; said Arthur F. Goldsby assignor to said Fred L. Goldsby Application September 6, 1946, Serial No. 695,156

5 Claims. (Cl. 222—161)

This invention relates to a device for the planting of vegetable, flower, grass, and other seed.

The hand sowing of any of the common garden seed produces a problem, because the seeds are small and should be handled individually. Usually, however, the gardener is impatient and scatters the seed wastefully.

The present invention provides a simple, light, and inexpensive hand seeder, capable of handling seeds of all sizes. Its basic principle is a seed trough through which seed is moved and from which it may be scattered by vibration. The preferred embodiment of the invention is illustrated in the drawings in which:

Figure 1 is a side elevation, partially in section;

Figure 2 is a top plan view;

Figure 3 is a front elevation partially in section; and

Figure 4 is a schematic illustration of the electrical mechanism.

Referring to the drawings in greater detail, the device consists of a handle 6, to which the rigid plate 7 is secured by means of a bolt 8, and a pin 9 being inserted through the plate 7 to prevent rotation thereof about the bolt 8. Suitable washers 10 are interposed between the bolt head and the plate, and between the plate and the handle, and the plate 7 is preferably loosely held so that it is free to vibrate on the bolt 8 with its edges moving generally vertically when the device is in use with the plate horizontal. A rigid connection will operate satisfactorily, as the entire device then vibrates; but the loose connection is preferred. Preferably the plate 7 is hung below the handle 6, as illustrated, so as to permit a close approach to the ground.

The plate 7 has a rigid feed trough 11 extending along one of its edges, said trough preferably being V-shaped, and having an included angle of 15° to 35°. While this angular range is in no way critical, it seems to provide the best handling of a wide variety of seed of varying size. The trough 11 may be provided with a seed container 12 which has an opening 13 communicating with the trough 11, or with clips 12a in which an open package of seed may be secured. Mounted on the plate 7 is an electric vibrator 14 which is composed of the usual electromagnet 15, vibrator 16 mounted on a spring 17, contact point 18, and binding posts 19. The plate 7 and integral trough 11 form a seeder member.

The handle 6 includes a battery receptacle 20 having two electrical contacts 21 and 22, the contact 21 consisting of a metallic insert in the wall of the receptacle 20, and the contact 22 consisting of a metallic screw thread insulated from the contact 21. A dry cell 23 has its carbon electrode in contact with the contact 21 and its zinc electrode in contact with a metal spring 24 in the top closure 25 of the receptacle 20, which spring 24 is electrically connected with the contact 22. The vibrator circuit is completed by wires 26 which connect the binding posts 19 to the battery receptacle contacts 21 and 22. A switch 27 is included in the vibrator circuit, said switch being in a normally open position, and being activatable by finger pressure to close the circuit, thus permitting operation of the vibrator 14.

The term "rigid" as applied to the plate 7 and the feed trough 11 is used to mean that each of those members is capable of responding to the vibratory impulses impressed upon it.

While the vibrator 14 is preferably mounted on the plate 7 or on the seed trough 11, it has been found that satisfactory results may be obtained by securing the vibrator 14 to the handle 6, so that the entire seeder vibrates.

The operation of the device is obvious from the above detailed description. Seed may be placed in the trough 11, or in the seed container 12, (or alternatively a package of see may be secured by the clips 12a) the device is carried by the handle 6 and in order to sow the seed it is merely necessary to press the finger switch 27, permitting the action of the vibrator 14 to vibrate the plate 7, thus scattering the seed from the trough in a very uniform manner.

The seed may be made to discharge either from the end of the trough 11, or over its outer lip 28, depending upon the angle at which the seed planter is held.

The foregoing detailed description has been given for clearness of understanding only, and no unnecessary limitations should be understood therefrom.

We claim:

1. A seed planter comprising: a handle; a horizontal rigid plate connected to the handle; a feed trough on the plate and spaced from the connection between the handle and the plate; and self contained means for rapidly vibrating the plate to cause seed in the feed trough to move therefrom.

2. A speed planter according to claim 1 wherein the plate is connected beneath the handle.

3. A seed planter according to claim 2 wherein the connection is centered with respect to the plate and the self contained means is mounted on the plate at the side opposite the feed trough.

4. A seed planter according to claim 1 wherein the plate is loosely connected to the handle so as to vibrate independently of the handle.

5. A seed planter according to claim 3 wherein the plate is suspended from the handle by a single post and means are provided to prevent rotation of the plate about the post.

ARTHUR F. GOLDSBY.
FRED L. GOLDSBY.

REFERENCES CITED

The following references are of record in the file of this patent:

UNITED STATES PATENTS

| Number | Name | Date |
|---|---|---|
| 226,731 | Eddy | Apr. 20, 1880 |
| 1,317,133 | Hilton | Sept. 23, 1919 |
| 1,456,653 | Schling | May 29, 1923 |
| 1,587,934 | Bartlett | June 8, 1926 |
| 2,278,150 | Roscoe | Mar. 31, 1942 |
| 2,525,641 | Bouska | Oct. 10, 1950 |

FOREIGN PATENTS

| Number | Country | Date |
|---|---|---|
| 621,377 | Germany | Nov. 6, 1935 |
| 517,455 | Germany | Feb. 5, 1931 |
| 431,282 | Germany | July 8, 1926 |
| 102,580 | Austria | Feb. 25, 1926 |